Apr. 24, 1923.

C. H. ATKINS

THERMOSTATIC VALVE

Filed May 13, 1920

INVENTOR,
Charles H. Atkins
BY Harry W. Bowen
ATTORNEYS.

Patented Apr. 24, 1923.

UNITED STATES PATENT OFFICE.

1,452,723

CHARLES H. ATKINS, OF PALMER, MASSACHUSETTS, ASSIGNOR TO PHOENIX SPRINKLER COMPANY, OF SPRINGFIELD, MASSACHUSETTS, A CORPORATION OF MASSACHUSETTS.

THERMOSTATIC VALVE.

Application filed May 13, 1920. Serial No. 381,104.

*To all whom it may concern:*

Be it known that I, CHARLES H. ATKINS, a citizen of the United States of America, residing at Palmer, in the county of Hampden and Commonwealth of Massachusetts, have invented certain new and useful Improvements in Thermostatic Valves, of which the following is a specification.

This invention relates to improvements in devices or apparatus for automatically opening and closing a valve for the purpose of supplying water to sprinkler systems as used at the present time in department stores, factories, and manufacturing plants of various kinds. Broadly considered, the device is controlled by means of a thermostat which may be accurately adjusted to operate at a predetermined temperature whereby the controlling valve may be opened and closed and the supply of water turned on or off.

An object of this improvement is to provide a device that will automatically open against the water supply pressure, and close with the pressure. A further object is to provide a device that will be noiseless in operation, or to provide what is known as a cushion effect, and to prevent water hammer.

Referring to the drawings.

Figure 1:
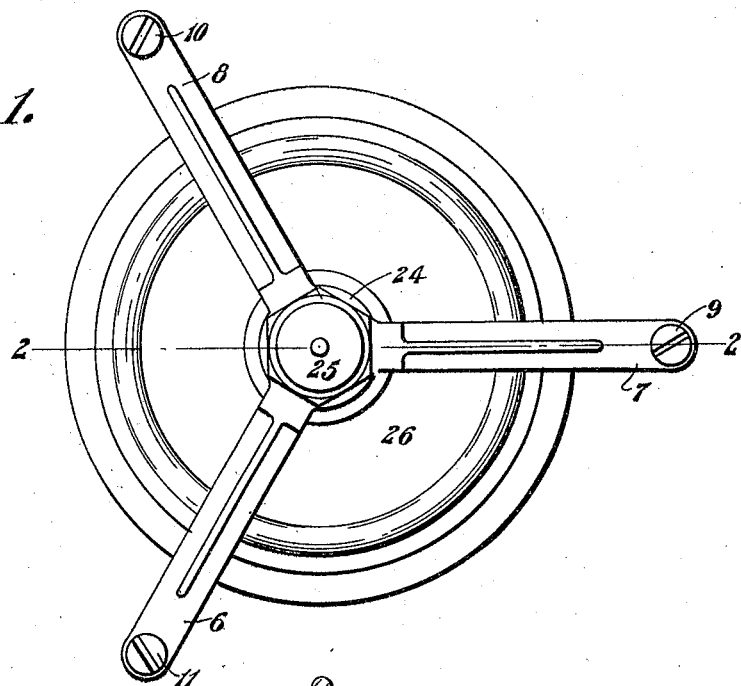
Fig. 1 is an external plan view of the device.
Figure 2:
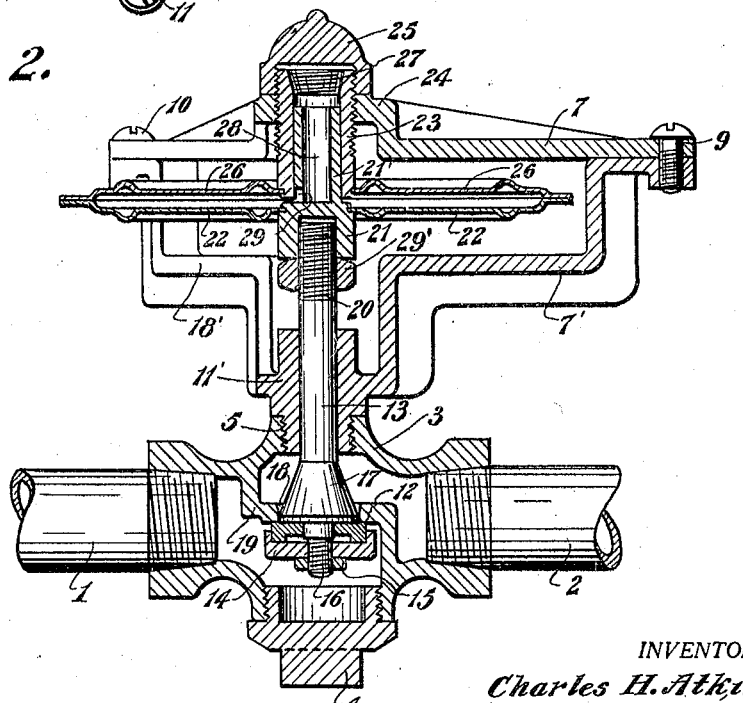
Fig. 2 is a vertical sectional view on the line 2—2 of Fig. 1 showing the interior construction of the operative parts and an upper and lower spider arm in section.

Referring to the drawings in detail: 1 and 2 designate the supply and discharge pipes which are connected to the valve casing 3. 4 designates a plug for closing the bottom of the casing and for furnishing an opening for machining the valve seat and assembling the valve. Connected to the valve casing 3 by means of the screw threads 5 is the spider or supporting members for the valve operating parts. Three spider arms 6, 7, and 8 are shown in the plan view in Fig. 1 which are secured to the corresponding number of arms below these arms, by means of the screws 9, 10, and 11. 12 designates the valve or packing element which may consist of any suitable material, as fibre or rubber. This packing is held in place on the valve stem 13 by means of the disc-shaped member 14 and nut 15 which is threaded onto the projection 16. The stem 13 is formed with an inclined or conical shaped portion 17, the base-portion of which is nearly equal in diameter to the diameter of the port opening 18 in the bridge or partition piece 19 of the valve casing. The purpose of forming this part of the stem conical shaped is to cause the valve to close or seat without producing water hammer or noise. This is accomplished by gradually reducing the size of the port 18 as the valve moves onto its seat.

Referring now to the thermostatic construction of the sprinkler valve, 20 designates the threaded upper end of the valve stem onto which is screwed the piece 21 having the sleeve portion 21′, and to which is secured the lower diaphragm disc member 22 by spinning or brazing the metal about the edge of the opening in the member 22. The sleeve portion 21′ has a sliding movement in the fixed outer sleeve 23 which is formed with a thread on its outer surface and threaded into an opening in the center of the hub-portion 24 of the upper spider member. The outer sleeve is locked or held in its adjusted position by means of the cap piece 25. The upper diaphragm disc member 26 is secured to the fixed sleeve 23 in the same manner as already described in connection with the lower disc member 22. 27 designates a closing plug for the upper end of the outer sleeve 23. This plug permits the introduction of the volatile liquid to the space between the diaphragms, the liquid flowing downward through the opening 28 and out through the opening 29 into the space between the diaphragms. The nut 29′ securely locks the diaphragms and sleeve 23 to the valve stem 13. By revolving the diaphragms the sleeve 23 is rotated in the threaded opening of the hub member 24 thereby providing accurate means for positioning the valve on its seat.

In practice the device is preferably so positioned that the pipes 1 and 2 stand in a vertical position. The volatile liquid in the diaphragm may, if desired, only partially fill the interior space.

The operation may be described as follows: The parts normally are in the positions shown with the valve closed on its seat. Should a fire start, and the temperature of the surrounding atmosphere be raised to a definite predetermined temperature, say 180°

F., the volatile liquid in the diaphragm will cause the members 22 and 26 to expand or separate causing the valve 12 to be moved outward away from its seat and against the pressure of the water supply in the pipe 1. The inner sleeve 21' will slide within the outer fixed sleeve 23. Since the sleeve 23 is fixed the diaphragm disc-member 26 cannot move but will cause the other disc member 22 to move a greater distance. The valve 12 will remain open as long as the temperature of the surrounding atmosphere is above the predetermined temperature, at which temperature the instrument or device is set. When the temperature falls the parts will again assume their normal positions, and the valve 12 will close with the pressure. As the valve moves towards its seat, the conical or inclined surface 17 will gradually shut off the flow or rush of water thus finally bringing the valve to its seat without any perceptible noise.

An important feature of the present invention is that in case the fire should start again after being wholly or partially extinguished, the apparatus would again operate to furnish the water for the sprinkler systems; thus being at all times automatic in its operation, and would not require the duties of an attendant to open and close valves in the piping system. Another important feature is that the valve is automatically retained on its seat by the water pressure, thereby rendering the device more reliable and preventing its being accidentally opened unless moved from its seat by the action of heat on the volatile liquid. The sleeve portion 21' slides downward in the fixed sleeve 23, which serves as a means for guiding the movements of the upper end of the valve stem 13.

It should be observed that when the valve opens, the base-portion of the conical shaped stem passes through the opening in the valve seat, and when the valve closes, this conical shaped portion again passes through the opening, gradually closing the same, and thereby prevents water hammer as the valve proper moves to its closed position.

What I claim is:

1. In a mounting for a double walled expansible diaphragm chamber, a fixed sleeve to which the outer wall of the chamber is secured, and a movable sleeve to which the other wall is secured, the latter sleeve being slidably located within the fixed sleeve for the purpose of furnishing means for aligning the latter sleeve and for filling the space between the diaphragm.

2. The combination, in a thermostatically controlled valve, of a casing having a port therein, supply and discharge pipes connected to the casing, a valve for the port, means for operating the valve including a double walled diaphragm chamber filled with a volatile expansible liquid and connected to the valve, a fixed and a movable sleeve, one of the diaphragm walls being fixed and the other wall movable, the movable wall being connected to the movable sleeve which is mounted for movement in the fixed sleeve, and the fixed sleeve providing means for adjusting the diaphragm and valve relative to the valve seat.

3. In combination, a valve casing having a single port therein, a suitable valve therefor, a valve stem, a normally fixed but adjustable sleeve, a movable sleeve within said sleeve, a movable diaphragm expansive chamber enclosed by two walls, one wall of the chamber being connected to the valve stem and movable sleeve, and the other wall to the fixed sleeve, the movable sleeve providing adjustment of the stem and valve and as a guide for one end of the stem.

4. In a thermostatically controlled valve, the combination, of a valve casing, a valve therefor, a stem attached to the valve, a diaphragm chamber having two walls spaced from each other to receive a volatile fluid, one wall being connected to the stem, an adjustable hollow sleeve to which the other wall is attached and having communication with the interior of the diaphragm, said hollow sleeve providing means to adjust the valve with relation to its seat, a spider construction in which the stem and sleeve are located, a plug for closing the stem, and a second hollow sleeve attached to the stem and movable within the first sleeve.

5. In a thermostatically controlled valve, the combination, with the valve and its stem, of devices for operating the valve, said devices comprising a thermostat having double walls to form an expansive chamber, an adjustable sleeve to which one wall is secured, a freely sliding sleeve located within said sleeve and to which the other wall is secured, the valve stem being also secured to the last mentioned wall, whereby upon expansion of the walls the valve will be operated.

6. In a thermostatically controlled valve structure, the combination, of a double walled expansible diaphragm, one wall of the same being fixed and the other movable, a casing in which the valve is located, supply and discharge pipes connected to the casing, a valve seat having an opening therethrough, a single conical shaped valve supporting member with its base part located in the opening when the valve is in its closed position, to close the opening, a valve stem which is connected to the movable wall of the diaphragm, the construction and arrangement being such that upon the outward movement of the movable wall the valve is moved away from its seat against the incoming pressure, and upon the inward movement of the wall the valve is moved to its seat and the conical shaped member will gradually close the opening to prevent hammer action.

7. In a thermostatically controlled valve structure for liquids, the combination, of an enclosing casing formed with a valve seat having an opening therethrough, a valve therefor, a conical shaped member to which the valve is connected, the valve being located on the pressure side of the seat and the conical shaped member having its base part in and partially filling the opening of the valve seat and the apex part of the cone extending away from the pressure side, means including a thermostatically operated diaphragm for operating the valve, the construction and arrangement being such that as the valve moves to its seat with the pressure of the liquid the base part of the cone will gradually close the opening in the seat to overcome hammer action, as described.

CHARLES H. ATKINS.